US012634468B2

(12) United States Patent
Gao et al.

(10) Patent No.: US 12,634,468 B2
(45) Date of Patent: May 19, 2026

(54) DECODER-SIDE MOTION VECTOR REFINEMENT WITH SCALING

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Jing Ye, Palo Alto, CA (US); Madhu Peringassery Krishnan, Palo Alto, CA (US); Tianqi Liu, Palo Alto, CA (US); Yushin Cho, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/803,154

(22) Filed: Aug. 13, 2024

(65) Prior Publication Data

US 2025/0294159 A1     Sep. 18, 2025

Related U.S. Application Data

(60) Provisional application No. 63/564,417, filed on Mar. 12, 2024.

(51) Int. Cl.
| | |
|---|---|
| *H04N 19/105* | (2014.01) |
| *H04N 19/137* | (2014.01) |
| *H04N 19/139* | (2014.01) |
| *H04N 19/172* | (2014.01) |
| *H04N 19/176* | (2014.01) |

(52) U.S. Cl.
CPC ......... *H04N 19/137* (2014.11); *H04N 19/105* (2014.11); *H04N 19/172* (2014.11); *H04N 19/176* (2014.11)

(58) Field of Classification Search
CPC .. H04N 19/159; H04N 19/521; H04N 19/577; H04N 19/105; H04N 19/139
See application file for complete search history.

(56) References Cited

U.S. PATENT DOCUMENTS

| | | | | |
|---|---|---|---|---|
| 9,641,837 | B2 * | 5/2017 | Chuang ................. | H04N 19/58 |
| 10,194,166 | B2 * | 1/2019 | Kadono .............. | H04N 19/124 |
| 10,659,808 | B2 * | 5/2020 | Kadono ................ | H04N 19/30 |
| 11,539,972 | B2 * | 12/2022 | Moon .................. | H04N 19/176 |

(Continued)

OTHER PUBLICATIONS

Enhanced Motion Vector Difference Coding; Chen; Oct. 2016; (Year: 2016).*

(Continued)

*Primary Examiner* — Luis Perez-Fuentes
(74) *Attorney, Agent, or Firm* — Morgan, Lewis & Bockius LLP

(57) ABSTRACT

An example method of video coding includes receiving a video bitstream comprising a plurality of blocks and deriving a set of motion vectors for a current block of the plurality of blocks, the current block being within a current frame. The method also includes deriving a set of refined motion vectors for the current block using two or more reference pictures, the two or more reference pictures having different respective distances to the current frame. The method further includes reconstructing the current block based on the derived set of refined motion vectors.

20 Claims, 6 Drawing Sheets

┌─ 500

502 Receive a video bitstream comprising a plurality of blocks

504 Derive a set of motion vectors for a current block of the plurality of blocks, the current block being within a current frame 506 Derive a set of refined motion vectors for the current block using two or more reference pictures, the two or more reference pictures having different respective distances to the current frame 508 Reconstruct the current block based on the derived set of refined motion vectors

┌─ 550

552 Receive video data comprising a plurality of blocks including a current block 554 Identify a set of motion vectors for a current block of the plurality of blocks, the current block being within a current frame 556 Identify a set of refined motion vectors for the current block using two or more reference pictures, the two or more reference pictures having different respective distances to the current frame 558 Encode the current block using the set of refined subblock motion vectors

(56) References Cited

U.S. PATENT DOCUMENTS

| | | | |
|---|---|---|---|
| 12,052,437 B2 * | 7/2024 | Zhao | H04N 19/573 |
| 12,192,512 B2 * | 1/2025 | Jeong | H04N 19/105 |
| 12,231,670 B2 * | 2/2025 | Moon | H04N 19/119 |
| 12,375,710 B2 * | 7/2025 | Zhao | H04N 19/176 |
| 2017/0105006 A1 * | 4/2017 | Lin | H04N 19/156 |
| 2023/0379455 A1 * | 11/2023 | Lim | H04N 19/56 |
| 2024/0214565 A1 * | 6/2024 | Liu | H04N 19/117 |

OTHER PUBLICATIONS

Enhanced motion vector difference coding; Chen—Qualcomm; 2016. (Year: 2016).*

Decoder-Side Motion Vector derivation with switchable template matching;—2010. (Year: 2010).*

Complexity reduction on decoder-side motion vector refinement (DMVR); Xu—2018. (Year: 2018).*

\* cited by examiner

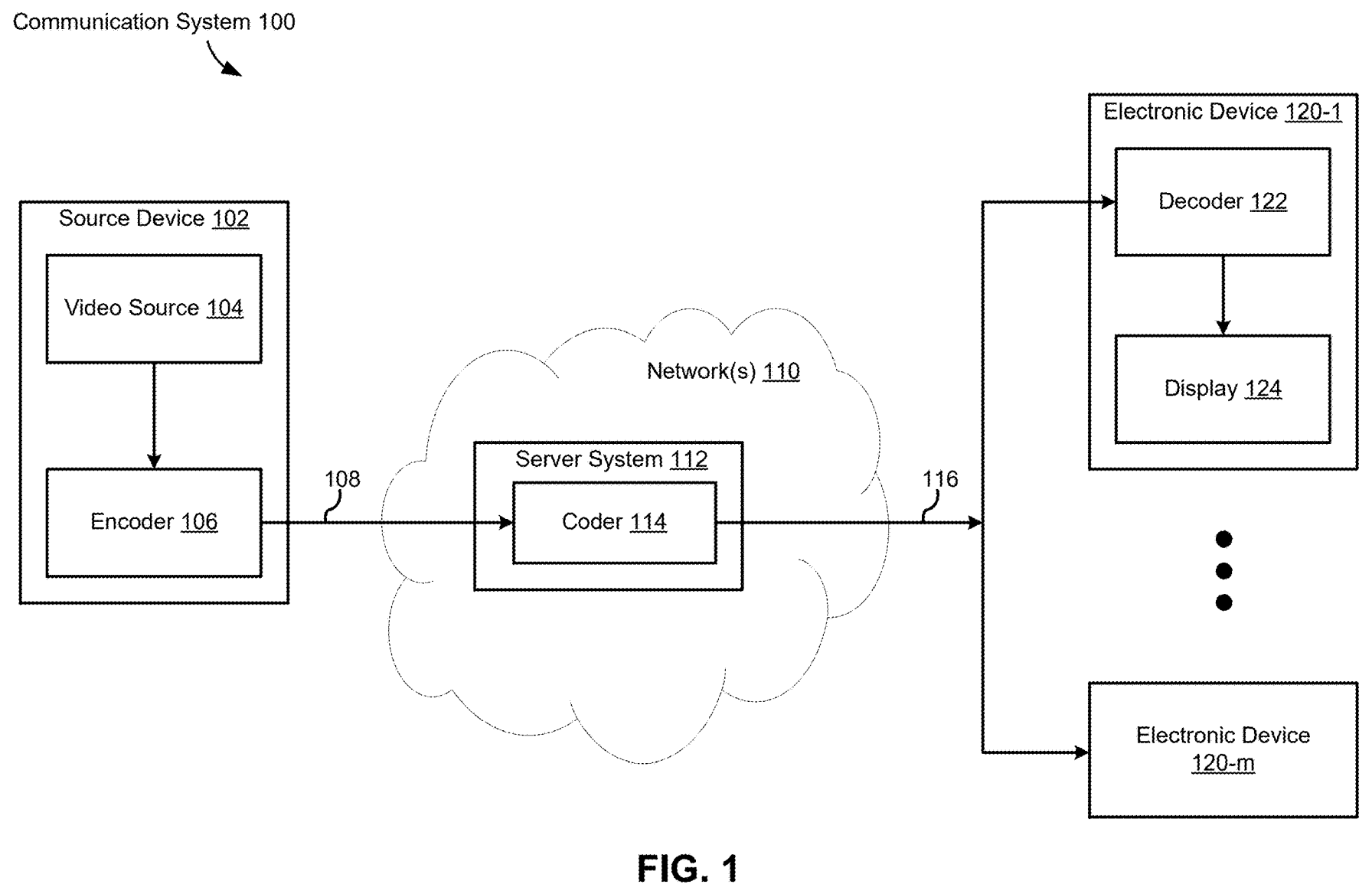

Communication System 100

Source Device 102

Video Source 104

Encoder 106

108

Network(s) 110

Server System 112

Coder 114

116

Electronic Device 120-1

Decoder 122

Display 124

Electronic Device 120-m

FIG. 1

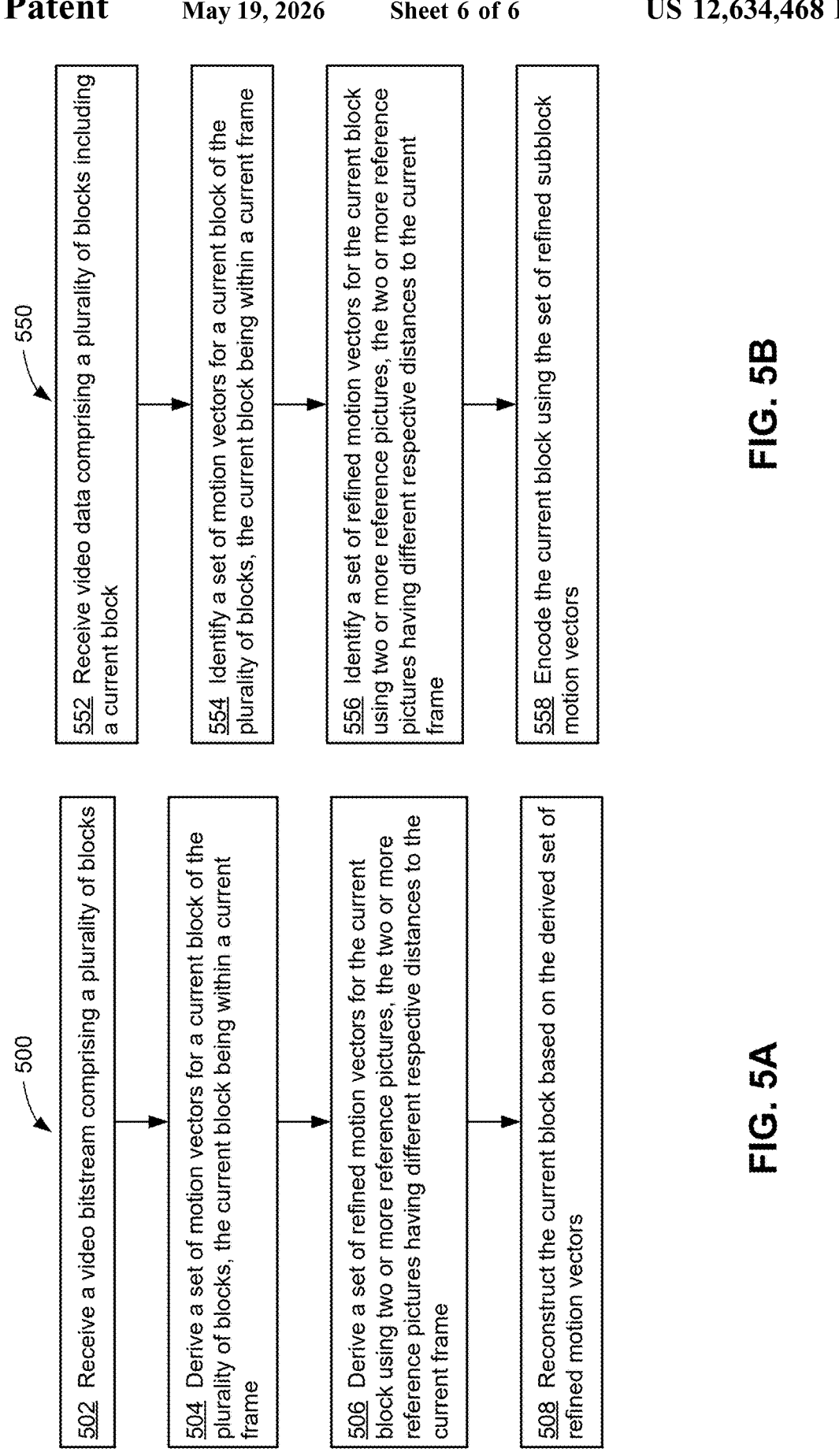

550

552  Receive video data comprising a plurality of blocks including a current block 554  Identify a set of motion vectors for a current block of the plurality of blocks, the current block being within a current frame 556  Identify a set of refined motion vectors for the current block using two or more reference pictures, the two or more reference pictures having different respective distances to the current frame 558  Encode the current block using the set of refined subblock motion vectors

502  Receive a video bitstream comprising a plurality of blocks

504  Derive a set of motion vectors for a current block of the plurality of blocks, the current block being within a current frame 506  Derive a set of refined motion vectors for the current block using two or more reference pictures, the two or more reference pictures having different respective distances to the current frame 508  Reconstruct the current block based on the derived set of refined motion vectors

FIG. 5A

DECODER-SIDE MOTION VECTOR REFINEMENT WITH SCALING

RELATED APPLICATIONS

This application claims priority to U.S. Provisional Patent Application No. 63/564,417, entitled "Decoder-Side Motion Vector Refinement with Scaling" filed Mar. 12, 2024, which is hereby incorporated by reference in its entirety.

TECHNICAL FIELD

The disclosed embodiments relate generally to video coding, including but not limited to systems and methods for refining motion vectors using reference pictures of varying distances.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes, amongst other things, a set of techniques for video (image) compression related to decoder side motion vector refinement (DMVR). For example, subsampling methods for decoder side motion vector refinement distortion computations with scaling are disclosed. As an example, a DMVR process may be performed using reference pictures at different distances from a current frame, which can improve coding accuracy. As another example, a DMVR process may be performed using multiple reference pictures on a same side of the current frame (e.g., two preceding reference pictures), which can also improve coding accuracy and allows for DMVR to be performed in a streaming context (e.g., in which subsequent reference frames are not available). As another example, a DMVR process may be performed using reference pictures at different temporal levels, which can also improve coding accuracy.

In accordance with some embodiments, a method of video decoding includes: (i) receiving a video bitstream (e.g., a source video sequence) comprising a plurality of blocks (e.g., corresponding to one or more pictures); (ii) deriving a set of motion vectors for a current block of the plurality of blocks, the current block being within a current frame; (iii) deriving a set of refined motion vectors for the current block using two or more reference pictures, the two or more reference pictures having different respective distances to the current frame; and (iv) reconstructing the current block based on the derived set of refined motion vectors.

In accordance with some embodiments, a method of video encoding includes (i) receiving video data (e.g., a source video sequence) comprising a plurality of blocks (e.g., corresponding to one or more pictures) including a current block; (ii) identifying a set of motion vectors for a current block of the plurality of blocks, the current block being within a current frame; (iii) identifying a set of refined motion vectors for the current block using two or more reference pictures, the two or more reference pictures having different respective distances to the current frame; and (iv) encoding the current block using the set of refined subblock motion vectors.

In accordance with some embodiments, a method of processing visual media data includes: (i) obtaining a source video sequence; and (ii) performing a conversion between the source video sequence and a bitstream of visual media data according to a format rule, where (a) the bitstream comprises a set of encoded blocks, including a current block in a current frame, and (b) the format rule specifies that: (1) a set of motion vectors are to be derived for the current block, and (2) a set of refined motion vectors are to be derived for the current block using two or more reference pictures, the two or more reference pictures having different respective distances to the current frame.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder). In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 5A illustrates an example video decoding process in accordance with some embodiments.

FIG. 5B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
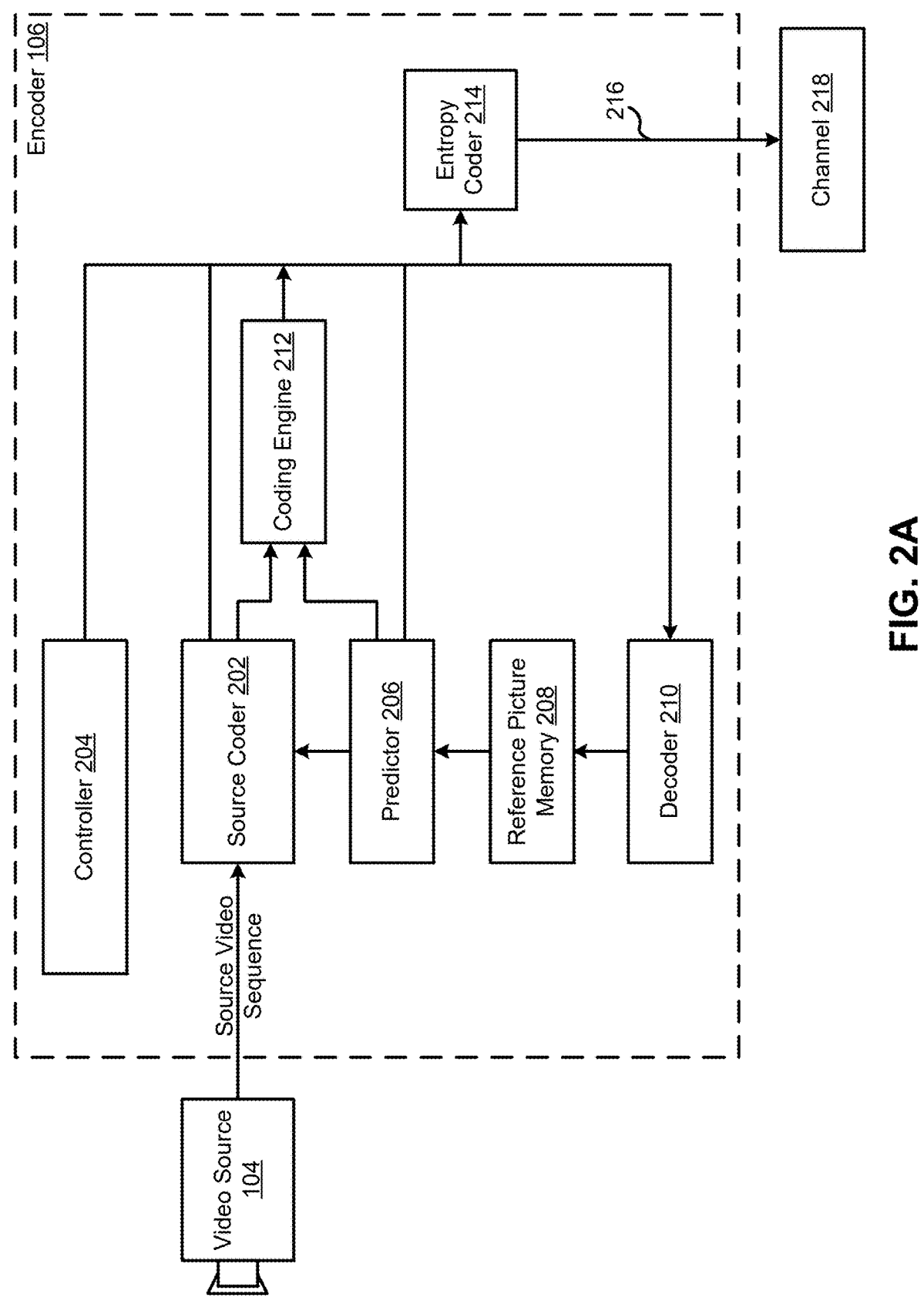
FIG. 2A is a block diagram illustrating example elements of an encoder component in accordance with some embodiments.

The present disclosure describes video/image compression techniques including temporal motion vector prediction (TMVP) and decoder side motion vector refinement (DMVR). The TMVP techniques include subblock-based TMVP that uses motion information at a subblock-level from a collocated reference picture. The DMVR techniques include applying bilateral matching to refine an input motion vector pair and using the refined motion vector pair for a motion compensated prediction of components. The present disclosure further describes performing DMVR with scaling. For example, reference pictures may be at varying distances and/or temporal levels and scaling factors (or other weights) may be applied to the motion vectors and/or motion vector differences for the reference pictures. performing DMVR with scaling in these ways can improve coding accuracy as the best reference pictures are not at a same distance from the current frame in some circumstances. The DMVR techniques may also include using multiple reference pictures from a same side of the current frame (e.g., two preceding reference pictures), which allows for DMVR to be used in a streaming context and can also improve coding accuracy (e.g., when the two best reference pictures are on a same side).

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-$m$) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory

208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
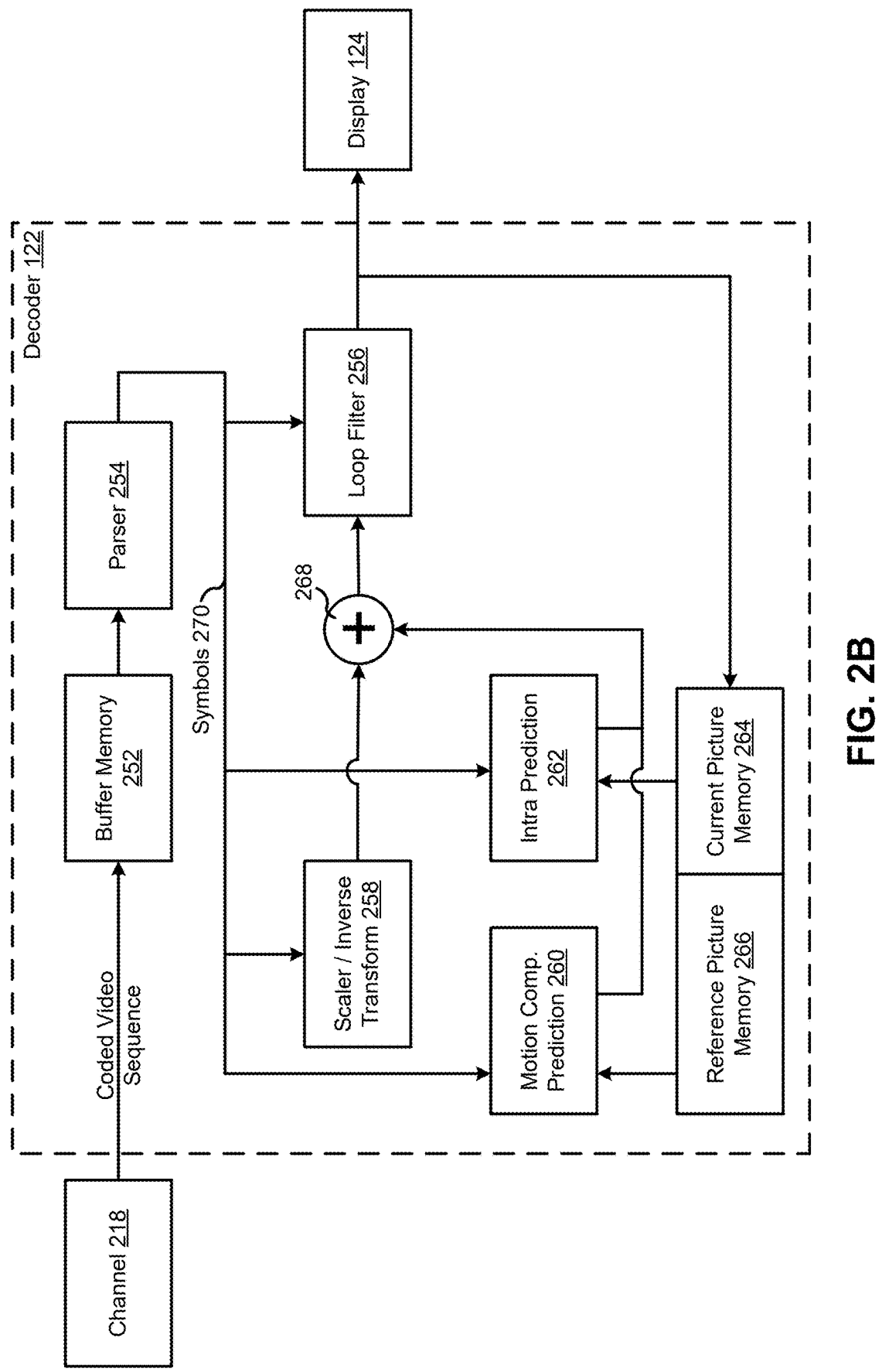
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/ inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
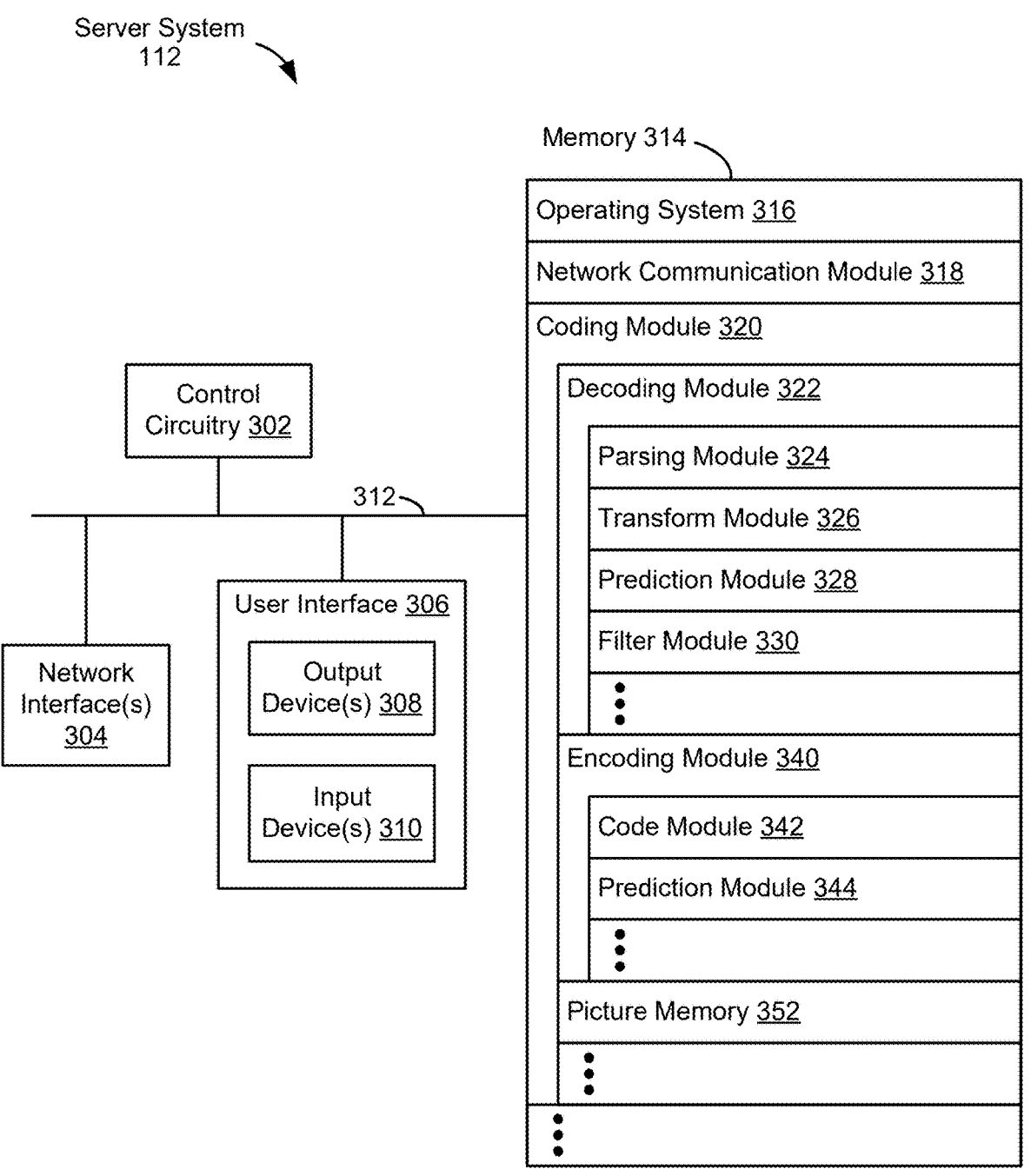
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:
- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
    - a decoding module 322 for performing various functions with respect to decoding encoded data, such as those described previously with respect to the decoder component 122; and
    - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). According to some embodiments, methods for inter prediction with vector refinement are described.

As discussed above, some codecs (e.g., AV1 and VVC) operate on pixel blocks. Each pixel block may be processed in a predictive-transform coding scheme, where a prediction is obtained using reference pixels and/or motion compensation. For inter-predicted blocks, motion parameters such as motion vectors, reference picture indices, reference picture list usage index, and/or additional information needed may be used for inter-predicted sample generation. The motion parameters can be signaled in an explicit or implicit manner. As discussed above, inter-predicted blocks can use temporal motion vectors and/or spatial motion vectors. Additionally, a subblock level motion vector refinement may be applied to extend a block-level TMVP.

Figure 4A:
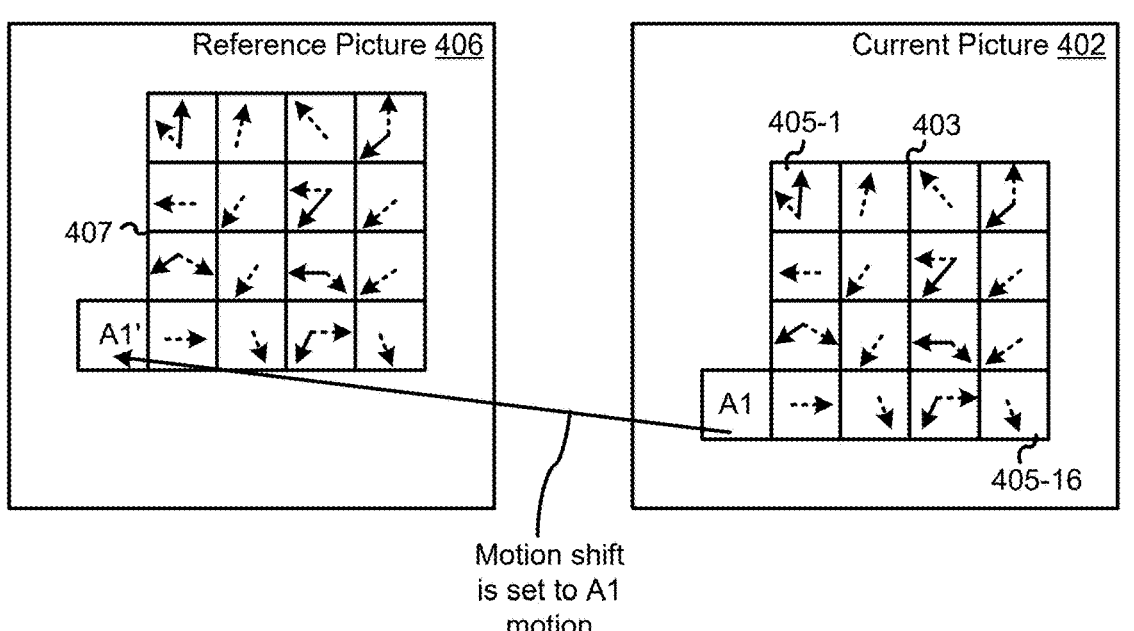
FIG. 4A illustrates an example of deriving subblock motion vectors in accordance with some embodiments.

FIG. 4A illustrates an example of deriving subblock motion vectors in accordance with some embodiments. In FIG. 4A, a current picture 402 includes a current block 403 that is composed of subblocks 405-1 through 405-15. The number and sizing of subblocks and blocks in FIG. 4A is merely an example and in other embodiments, different numbers and sizes of blocks and subblocks are used. FIG. 4A further shows a reference picture 406 with a reference block 407 corresponding to the current block 403. In some embodiments, the reference pictures 406 and 404 are different distances from the current picture 402. In the example of FIG. 4A, the reference block 407 is identified using a motion shift derived from the motion in block A1. The arrows in the subblocks in FIG. 4A illustrate motion vectors, with the dashed line arrows corresponding to motion from an L0 reference picture and the solid line arrows corresponding to motion from an L1 reference picture.

Thus, FIG. 4A illustrates an example of subblock-based TMVP (SbTMVP). SbTMVP may predict the motion vectors of the subblocks within the current block in two steps. In a first step, the spatial neighbor, denoted A1 in FIG. 4A, is identified. If A1 has a motion vector that uses the collocated picture as its reference picture, this motion vector is selected to be the motion shift (or displacement vector) to be applied. If no such motion is identified, then the motion shift may be set to (0, 0). The example in FIG. 4A uses a motion shift based on the motion vector from block A1.

In the second step, the motion shift identified in the first step is applied (e.g., added to the current block's coordinates) to obtain subblock-level motion information (motion vectors and reference indices) from the collocated picture as shown in FIG. 4A. Then, for each subblock, the motion information of its corresponding block (e.g., the smallest motion grid that covers the center sample) in the collocated picture is used to derive the motion information for the subblock. After the motion information of the collocated subblock is identified, it is converted to motion vectors and reference indices of the current subblock in a similar way as the TMVP process, where temporal motion scaling is applied to align the reference pictures of the temporal motion vectors to those of the current block.

As described above, SbTMVP allows inheriting the motion information at a subblock-level from a collocated reference picture. For example, each subblock of a large size coding block (e.g., a CU) can have its own motion information without explicitly transmitting a block partition structure or motion information. SbTMVP may obtain motion information for each subblock in three steps. The first step is the derivation of displacement vector (DV) of the current coding block. In step two, the availability of the SbTMVP candidate is accessed and central motion is derived. In step three, the subblock motion information is derived from the corresponding subblock by the DV. Thus, unlike TMVP candidate derivation which always derives the temporal motion vectors from the collocated block in the reference frame, SbTMVP may apply a DV which is derived from the MV of the left neighboring coding block of the current coding block to find the corresponding subblock in the collocated picture for each subblock of the current CU. In case the corresponding subblock is not inter-coded, the motion information of the current subblock may be set to be the central motion.

In this way, SbTMVP uses a motion field in a collocated picture to improve motion vector prediction and merge mode for coding blocks in the current picture. The same collocated picture used by TMVP may be used for SbTMVP. SbTMVP differs from TMVP in that TMVP predicts motion at a coding block level whereas SbTMVP predicts motion at sub-coding block level. Additionally, TMVP fetches temporal motion vectors from a collocated block in the collocated picture (e.g., the collocated block is the bottom-right or center block relative to the current CU), whereas SbTMVP applies a motion shift before fetching the temporal motion information from the collocated picture. The motion shift may be obtained from the motion vector from one of the spatial neighboring blocks of the current coding block.

Figure 4B:
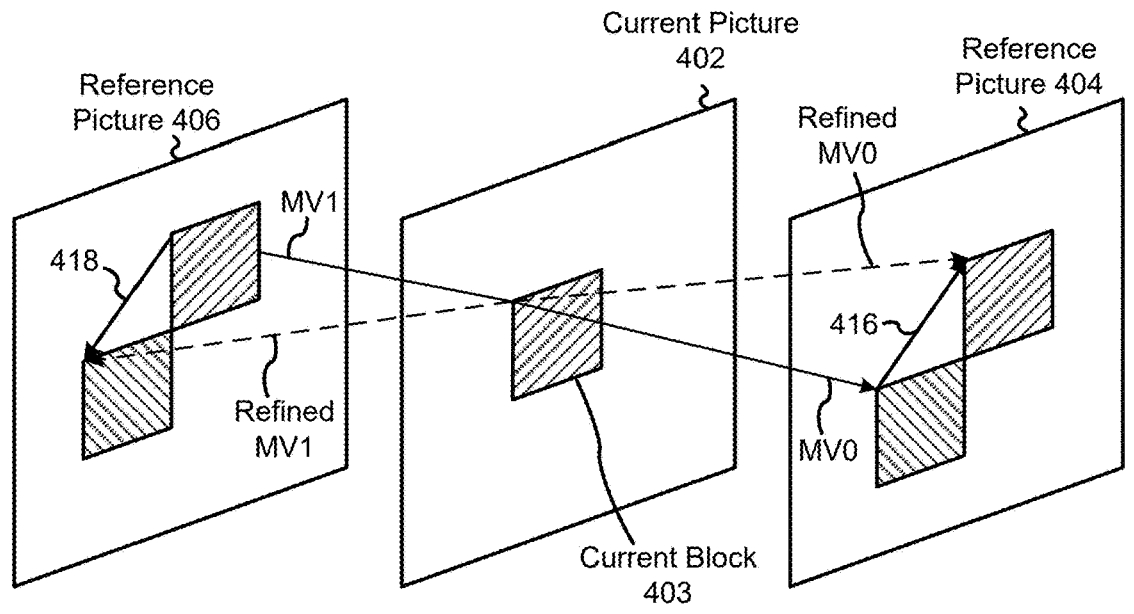
FIG. 4B illustrates an example of decoder-side motion vector refinement in accordance with some embodiments.

FIG. 4B illustrates an example of decoder-side motion vector refinement in accordance with some embodiments. In FIG. 4B, refined motion vectors (Refined MV0 and Refined MV1) are derived using a set of reference picture 404 and 406. An initial reference block may be identified in each reference picture using initial motion vectors, MV0 and MV1. A motion difference (indicated by arrows 416 and 418 in FIG. 4B) is applied to each motion vector in FIG. 4B to derive the refined motion vectors. Thus, FIG. 4B illustrates an example of decoder side motion vector refinement (DMVR) being applied to a coding block (e.g., in a merge mode). The pair of MVs obtained from a regular merge candidate may be used as input of the DMVR process. DMVR applies the bilateral matching (BM) to refine the input MV pair {mvL0, mvL1} and uses the refined MV pair for the motion compensated prediction (e.g., of both luma and chroma components). The output MV of DMVR, a refined MV pair, is defined in Equation Set 1:

Equation Set 1—Refined Motion Vector Pair $$mv_{refinedL0} = mv_{L0} + \Delta mv$$

$$mv_{refinedL1} = mv_{L1} - \Delta mv$$

In Equation Set 1, a motion vector difference, $\Delta mv$, is applied to the input MV pair to obtain the refined MV pair by using an MVD mirroring property (e.g., because the input MV pair point to two different reference pictures that have equal difference in picture order count (POC) to the current picture and these two reference pictures are at different temporal direction).

In an example DMVR process, a luma coded block is divided into 16×16 subblocks for the MV refinement process. The $\Delta mv$ is derived independently for each subblocks in the following two steps, an integer precision motion search followed by a fractional motion search. Finally, the subblock motion compensation (MC) is applied using the refined MV pair {mvrefinedL0, mvrefinedL1}.

An integer sample offset search may be performed in DMVR. In an example implementation, a search space includes MV pair candidates (e.g., 25 pair candidates) as shown in Equation Set 2:

Equation Set 2—Search Space for MV Pair Candidates $$mv_{L0(i,j)} = mv_{L0(0,0)} + (i, j)$$

$$mv_{L1(i,j)} = mv_{L1(0,0)} - (i, j)$$

where (i, j) represents the coordinate of the search point around the initial MV pair, and i and j are integer value between −2 and 2 inclusive. The sum of absolute difference (SAD) for the initial MV pair is calculated as shown in Equation Set 3 below:

Equation Set 3—SAD Calculation $$SAD(i, j) = K \sum_{n=0}^{\frac{H}{2}} \sum_{m=0}^{W} diff_{m,n}$$

$$diff_{m,n} = \mathrm{abs}(P0_{i,j}[m + i, 2n + j] - P1_{i,j}[m - i, 2n - j])$$

$$K = \begin{cases} 3/4 & i = 0, \ j = 0 \\ 1 & \text{otherwise} \end{cases}$$

where W and H are the weight and height of the subblock. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. In some embodiments, e.g., to reduce the penalty of the uncertainty of DMVR refinement, the SAD between the reference blocks referred by the initial MV candidates is decreased by ¼ of the SAD value.

In some embodiments, the candidate MV pair selected in the integer sample offset search step is further refined. For example, the fractional sample refinement may be derived by using parametric error surface equation (e.g., to save the calculational complexity), instead of additional search with SAD comparison. The fractional sample refinement is conditionally invoked based on the output of the integer sample search stage. For example, the fractional sample refinement is conditionally invoked based on the output of the integer sample search stage. As an example, when the integer sample search stage is terminated with center having the smallest SAD in either the first iteration or the second iteration search, the fractional sample refinement is further applied.

BDOF may be used to refine the bi-prediction signal of a coding block (e.g., a CU). For example, BDOF may be performed at a 4×4 subblock level. BDOF may be applied to a coding block if it satisfies at least a subset of the following conditions: (i) the coding block is coded using a bi-prediction mode in which one of the two reference pictures is prior to the current picture in display order and the other is after the current picture in display order, (ii) the distances (e.g., the POC difference) from two reference pictures to the current picture are same, (iii) both of the reference pictures are short-term reference pictures, (iv) the coding block is not coded using an affine mode or an SbTVMP merge mode, (v) coding unit has more than 64 luma samples, (vi) the coding unit height and width are larger than or equal to 8 luma samples, (vii) BCW weight index indicates equal weight, (viii) WP is not enabled for the current coding block, and (ix) CIIP mode is not used for the current coding block. In some implementations, BDOF is only applied to a luma component.

The BDOF mode is based on an optical flow concept, which assumes that the motion of an object is smooth. For each subblock (e.g., 4×4 subblock), a motion refinement ($v_x$, $v_y$) may be calculated by minimizing the difference between the L0 and L1 prediction samples. The motion refinement can then be used to adjust the bi-predicted sample values in the subblock, as discussed in detail below.

The horizontal and vertical gradients, $$\frac{\partial I^{(k)}}{\partial x}(i, j) \text{ and } \frac{\partial I^{(k)}}{\partial y}(i, j), \ k = 0,1,$$

of the two prediction signals can be computed by directly calculating the difference between two neighboring samples as shown below in Equation Set 4:

Equation Set 4—Gradient Calculations $$\frac{\partial I^{(k)}}{\partial x}(i, j) = \left( \left( I^{(k)}(i + 1, j) \gg shift1 \right) - \left( I^{(k)}(i - 1, j) \gg shift1 \right) \right)$$

$$\frac{\partial I^{(k)}}{\partial y}(i, j) = \left( \left( I^{(k)}(i, j + 1) \gg shift1 \right) - \left( I^{(k)}(i, j - 1) \gg shift1 \right) \right)$$

where $I^{(k)}(i, j)$ are the sample value at coordinate (i, j) of the prediction signal in list k, k=0,1, and shift1 is calculated based on the luma bit depth, bitDepth, as shift1=max (6, bitDepth−6). Then, the auto- and cross-correlation of the gradients, $S_1$, $S_2$, $S_3$, $S_5$ and $S_6$, are calculated as shown in Equation Set 5:

Equation Set 5—Auto—and Cross—correlation Calculations $$S_1 = \sum_{(i,j)\in\Omega} \mathrm{Abs}(\psi_x(i, j)), \ S_3 = \sum_{(i,j)\in\Omega} \theta(i, j) \cdot \mathrm{Sign}(\psi_x(i, j))$$

-continued $$S_2 = \sum_{(i,j)\in\Omega} \psi_x(i,j) \cdot \text{Sign}(\psi_y(i,j))$$

$$S_5 = \sum_{(i,j)\in\Omega} \text{Abs}(\psi_y(i,j)), \quad S_6 = \sum_{(i,j)\in\Omega} \theta(i,j) \cdot \text{Sign}(\psi_y(i,j))$$

where $\psi$ and $\theta$ are defined by Equation Set 6:

Equation Set 6

$$\psi_x(i,j) = \left(\frac{\partial I^{(1)}}{\partial x}(i,j) + \frac{\partial I^{(0)}}{\partial x}(i,j)\right) \gg n_a$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = \left(I^{(1)}(i,j) \gg n_b\right) - \left(I^{(0)}(i,j) \gg n_b\right)$$

where $\Omega$ is a 6×6 window around the subblock, and the values of $n_a$ and $n_b$ are set equal to min(1, bitDepth−11) and min (4, bitDepth−8), respectively.

The motion refinement $(v_x, v_y)$ can then be derived using the cross- and auto-correlation terms using Equation Set 7:

Equation Set 7—Motion Refinement Calculation $$v_x = S_1 > 0? \, clip3(-th'_{BIO}, th'_{BIO}, -((S_3 \cdot 2^{n_b - n_a}) \gg \lfloor \log_2 S_1 \rfloor)): 0$$

$$v_y = S_5 > 0? \, clip3\big(-th'_{BIO}, th'_{BIO}, -$$

$$\big((S_6 \cdot 2^{n_b - n_a} - ((v_x S_{2,m}) \ll n_{S_2} + v_x S_{2,s})/2) \gg \lfloor \log_2 S_5 \rfloor\big)): 0$$

where $S_{2,m}=S_2 \gg n_{S_2}$, $S_{2,s}=S_2 \& (2^{n_{S2}}-1)$, $th_{B10}=2^{max(5,BD-7)}$. $\lfloor \cdot \rfloor$ is the floor function, and $n_{S_2}=12$.

Based on the motion refinement and the gradients, an adjustment can be calculated for each sample in the subblock using Equation Set 8:

Equation Set 8—Motion Refinement Adjustment Calculation $$b(x,) =$$

$$rnd\left(\left(v_x\left(\frac{\partial I^{(1)}(x,y)}{\partial x} - \frac{\partial I^{(0)}(x,y)}{\partial x}\right) + v_y\left(\frac{\partial I^{(1)}(x,y)}{\partial y} - \frac{\partial I^{(0)}(x,y)}{\partial y}\right) + 1\right)/2\right)$$

The BDOF samples of the coding block can then be calculated by adjusting the bi-prediction samples as follows:

Equation 9—BDOF Calculation $$pred_{BDOF}(x,y) = \left(I^{(0)}(x,y) + I^{(1)}(x,y) + b(x,y) + o_{offset}\right) \gg \text{shift}$$

These values may be selected such that the multipliers in the BDOF process do not exceed 15-bit, and the maximum bit-width of the intermediate parameters in the BDOF process is kept within 32-bit.

To derive the gradient values, some prediction samples $I^{(k)}(i,j)$ in list k (k=0,1) outside of the current coding block boundaries may be identified and used. For example, BDOF may use one extended row/column around the coding block boundaries. For example, prediction samples in the extended area may be generated by taking the reference samples at the nearby integer positions (e.g., using a floor( ) operation on the coordinates) directly without interpolation (e.g., to control the computational complexity of generating the out-of-boundary prediction samples), and the normal 8-tap motion compensation interpolation filter is used to generate prediction samples within the coding block. These extended sample values may be used in the gradient calculation. For the other steps in the BDOF process, if any sample and gradient values outside of the coding block boundaries are needed, they may be padded (e.g., copied) from their nearest neighbors.

In some implementations, a multi-pass decoder-side motion vector refinement is applied. For example, in the first pass, bilateral matching (BM) is applied to the coding block, in the second pass, BM is applied to each 16×16 subblock within the coding block, and, in the third pass, the MV in each 8×8 subblock is refined by applying bi-directional optical flow (BDOF). The refined MVs may then be stored for subsequent spatial and/or temporal motion vector predictions.

As discussed above, decoder-side motion vector refinement refines motion vectors using the existing decoder-side information, e.g., the reconstructed samples. Additionally, an optical flow equation may be applied to formulate a least squares problem, from which fine motions can be derived from gradients of compound inter prediction samples. With those fine motions, the MV may be refined per subblock within a prediction block, thereby enhancing inter prediction quality. This implementation is an extension of BDOF as it supports MV refinement when the two reference blocks have arbitrary temporal distances to the current block. The gradient of the current whole block predictors may be precomputed and the subblock refined MVs may then be computed depending on the optical flow model.

Bilateral matching may be used for the MV refinement. In bilateral matching-based decoder side motion vector refinement, two candidate predictor blocks may be directly compared using distortion metrics such as the sum of absolute difference (SAD). The candidate blocks with lowest distortion may then be used as the refined block. Decoder side motion vector refinement can be performed at block level or subblock level. In the subblock level, the current block is divided into multiple subblocks, and each subblock bilateral matching is performed independently. The subblock based decoder-side motion vector refinement can achieve motion vector refinement at finer granularity, e.g., the subblock level, but the matching cost may be also less accurate as less samples are used to conclude the matching cost.

Prefetched samples referenced herein refer to a restricted maximum number of samples from the reference pictures that can be used in the bilateral matching process. Prefetching area referenced herein refers to the area occupied by the prefetched samples. The higher number of prefetched samples requires higher memory bandwidth when performing the bilateral matching process.

Building on the features and techniques described above, subsampling methods for decoder side motion vector refinement distortion computation with scaling are described below.

FIG. 5A is a flow diagram illustrating a method 500 of decoding video in accordance with some embodiments. The method 500 may be performed at a computing system (e.g., the server system 112, the source device 102, or the electronic device 120) having control circuitry and memory storing instructions for execution by the control circuitry. In some embodiments, the method 500 is performed by executing instructions stored in the memory (e.g., the memory 314) of the computing system.

The system receives (502) a video bitstream (e.g., a coded video sequence) comprising a plurality of blocks (e.g., corresponding to one or more pictures). The system derives (504) a set of motion vectors (e.g., using TMVP) for a current block of the plurality of blocks, the current block being within a current frame. The system derives (506) a set of refined motion vectors for the current block (e.g., using DMVR) using two or more reference pictures, the two or more reference pictures having different respective distances to the current frame. The system reconstructs (508) the current block based on the derived set of refined motion vectors. For example, the system decodes the current block using the derived set of refined motion vectors. In this way, a decoder-side motion vector refinement process with reference pictures of different distances (i.e., distance from reference pictures to the current picture) is allowed.

For example, a scale factor for the DMVR depends on the reference picture distances with the closer reference picture distance is denoted as do and the further reference picture distance being denoted as d1. As an example, the scaling factor for the refined MV difference (MVD) on the further reference picture may be d1/d0. For example, if the MVD on the closer motion vector moves one step, the MVD on the further reference pictures moves d1/d0 steps. If d1=4, and d0=2, then the MVD on the further reference picture moves 2 steps. Alternatively, the scale factor may be derived using d0 and d1 as input, and the output scale factor is provided using either a function or a look-up table. As an example, if d1/d0 is not an integer number, the scaling factor is rounded to the nearest integer. As another example, if d1/d0 is not an integer number, a fractional scaling factor is multiplied to the closer MVD to generate the MVD in the further reference frame.

In some embodiments, the MVD pre-fetching area is the same for two reference frames. In some embodiments, the MVD pre-fetching area depends on the scaling factor, and the pre-fetching area for the further reference frame is larger than the pre-fetching area of the close reference frame.

In some embodiments, the decoder side motion vector refinement is allowed only when the distance between two reference frames and current frame is within a threshold. As an example, if the distances between two reference frames and current frame are equal to or smaller than the threshold (e.g., 1 or 2), then decoder side motion vector refinement is allowed. In another example, if the ratio of the distances between two reference frames and current frame is smaller than or equal to one threshold, then decoder side motion vector refinement is allowed.

In some embodiments, the scaling of the motion vector (and/or the MVD) is performed on the reference picture that is further relative to the current picture. Alternatively, the scaling of the motion vector (and/or the MVD) is performed on the reference picture that is closer relative to the current picture.

In some embodiments, the scaling factor depends on coded information that is known to both encoder and decoder. For example, the coded information may include block size, block shape, magnitude of MVD refinement, and/or temporal distance between reference frame and the current frame.

In some embodiments, a decoder side motion vector refinement process with same-side reference pictures (i.e., both reference pictures are from the past, are from the future, or are the same picture) is allowed. As an example, if the reference pictures of the decoder side motion vector refinement process are on the same side, the sign of the MVD for both reference pictures are kept the same, i.e., without MVD mirroring. As another example, if the reference pictures are not the same, the scaling process as described above can be also applied with the same MVD signs.

In some embodiments, decoder side motion vector refinement process with different temporal levels of reference pictures is allowed. As an example, the scale factor depends on the reference picture temporal levels, the higher temporal levels of reference picture is denoted as do, and the lower temporal reference picture is denoted as d1. The scaling factor for the refinement MV difference (MVD) on the further reference picture may be d1/d0. For example, if the MVD on the higher temporal level motion vector moves one step, the MVD on the lower temporal reference picture moves d1/d0 steps. If d1=4, and d0=2, then the MVD on the lower temporal reference picture moves 2 steps.

FIG. 5B is a flow diagram illustrating a method 550 of encoding video in accordance with some embodiments. The method 550 may be performed at a computing system (e.g., the server system 112, the source device 102, or the electronic device 120) having control circuitry and memory storing instructions for execution by the control circuitry. In some embodiments, the method 550 is performed by executing instructions stored in the memory (e.g., the memory 314) of the computing system. In some embodiments, the method 550 is performed by a same system as the method 500 described above.

The system receives (552) video data (e.g., a source video sequence) comprising a plurality of blocks including a current block. The system identifies (554) a set of motion vectors for a current block of the plurality of blocks, the current block being within a current frame. The system identifies (556) a set of refined motion vectors for the current block using two or more reference pictures, the two or more reference pictures having different respective distances to the current frame. The system encodes (558) the current block using the set of refined subblock motion vectors. As described previously, the encoding process may mirror the decoding processes described herein (e.g., determining motion vectors). For brevity, those details are not repeated here.

Although FIGS. 5A and 5B illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning Now to Some Example Embodiments.

(A1) In one aspect, some embodiments include a method (e.g., the method 500) of video decoding. In some embodiments, the method is performed at a computing system (e.g., the server system 112) having memory and one or more processors. In some embodiments, the method is performed at a coding module (e.g., the coding module 320). The method includes: (i) receiving a video bitstream (e.g., a coded video sequence) comprising a plurality of blocks (e.g., corresponding to one or more pictures); (ii) deriving a set of motion vectors (e.g., using TMVP) for a current block of the plurality of blocks, the current block being within a current frame; (iii) deriving a set of refined motion vectors (e.g., using DMVR) for the current block using two or more reference pictures, the two or more reference pictures having different respective distances to the current frame; and (iv) reconstructing the current block based on the derived set of refined motion vectors. For example, a decoder side motion vector refinement process with different distances reference pictures (i.e., distance from reference pictures to the current picture) is allowed.

(A2) In some embodiments of A1, the method further includes applying a scale factor to a motion vector or a motion vector difference (MVD) corresponding to the set of refined motion vectors. For example, a scale factor depending on the reference picture distances.

(A3) In some embodiments of A2, the scale factor is applied to a closer reference picture of the two or more reference pictures. For example, the scaling of motion vector (or the MVD) is performed on the reference picture that is closer relative to the current picture.

(A4) In some embodiments of A2, the scale factor is applied to a further reference picture of the two or more reference pictures. For example, the scaling of motion vector (or the MVD) is performed on the reference picture that is further relative to the current picture.

(A5) In some embodiments of any of A2-A4, the scale factor corresponds to a ratio of the different respective distances. The closer reference picture distance may be denoted as d0, and the further reference picture distance may be denoted as d1. The scaling factor for the refinement MVD on the further reference picture may be d1/d0. As an example, if the MVD on the closer motion vector moves one step, the MVD on the further reference pictures moves d1/d0 steps, if d1=4, and d0=2, then the MVD on the further reference picture moves 2 steps.

(A6) In some embodiments of any of A2-A5, the scale factor is restricted to integer values. For example, if the d1/d0 is not an integer number, the scaling factor will round to integer.

(A7) In some embodiments of any of A2-A6, the scale factor is obtained from a lookup table. For example, the scale factor may be derived using d0 and d1 as input, and the output scale factor is provided using either a function or a look-up table.

(A8) In some embodiments of any of A2-A6, the scale factor is obtained from an equation by inputting the different respective distances.

(A9) In some embodiments of any of A2-A8, applying the scale factor comprises multiplying the scale factor with a first MVD corresponding to a closer reference picture of the two or more reference pictures to generate a second MVD corresponding to a further reference picture of the two or more reference pictures. For example, if the d1/d0 is not an integer number, a fractional scaling factor is multiplied to the closer MVD to generate the MVD in the further reference frame.

(A10) In some embodiments of any of A2-A9, pre-fetching areas for the two or more reference pictures are based on the scale factor. For example, the MVD pre-fetching area depends on the scaling factor.

(A11) In some embodiments of A10, a first pre-fetching area for a further reference picture is larger than a second pre-fetching area for a closer reference picture. For example, the pre-fetching area for further reference frame is larger than the pre-fetching area of the close reference frame.

(A12) In some embodiments of any of A2-A11, the scale factor is based on coded information. For example, the scaling factor may depend on any coded information that is known to both encoder and decoder, such as block size, block shape, magnitude of MVD refinement, and/or temporal distance between reference frame and the current frame.

(A13) In some embodiments of any of A1-A9 and A12, each reference picture of the two or more reference pictures has a same pre-fetching area. For example, the MVD pre-fetching area is the same for two reference frames.

(A14) In some embodiments of any of A1-A13, decoder side motion vector refinement is restricted when a distance between a reference picture of the two or more reference pictures and the current frame exceeds a predetermined threshold. For example, decoder side motion vector refinement is allowed only when the distance between two reference frames and current frame is within a threshold. In some embodiments, the decoder side motion vector refinement is restricted in accordance with a determination that the distance between the reference picture of the two or more reference pictures and the current frame exceeds the predetermined threshold.

(A15) In some embodiments of A14, the decoder side motion vector refinement is allowed when the different respective distances are less than or equal to the predetermined threshold. For example, if the distances between two reference frames and current frame are equal to or smaller than the threshold, then decoder side motion vector refinement may be allowed. In some embodiments, a set of refined motion vectors for the current block are derived using the two or more reference pictures in accordance with a determination that the different respective distances are less than or equal to the predetermined threshold.

(A16) In some embodiments of A14 or A15, the decoder side motion vector refinement is allowed when a ratio of the different respective distances are less than or equal to the predetermined threshold. For example, if the ratio of the distances between two reference frames and current frame is smaller than or equal to the threshold, then decoder side motion vector refinement may be allowed.

(A17) In some embodiments of any of A1-A16, the two or more reference pictures are on a same side of the current frame. For example, a decoder side motion vector refinement process with same side reference pictures (i.e., both reference pictures are from the past, are from the future, or are the same picture) is allowed.

(A18) In some embodiments of any of A1-A17, the two or more reference pictures corresponds to different temporal levels. For example, a decoder side motion vector refinement process with different temporal levels of reference pictures is allowed.

(B1) In another aspect, some embodiments include a method (e.g., the method 650) of video encoding. In some embodiments, the method is performed at a computing system (e.g., the server system 112) having memory and control circuitry. In some embodiments, the method is performed at a coding module (e.g., the coding module 320). The method includes: (i) receiving video data (e.g., a source video sequence) comprising a plurality of blocks (e.g., corresponding to one or more pictures) including a current block; (ii) identifying a set of motion vectors for a current block of the plurality of blocks, the current block being within a current frame; (iii) identifying a set of refined motion vectors for the current block using two or more reference pictures, the two or more reference pictures having different respective distances to the current frame; and (iv) encoding the current block using the set of refined subblock motion vectors.

(C1) In another aspect, some embodiments include a method of visual media data processing. In some embodiments, the method is performed at a computing system (e.g., the server system 112) having memory and control circuitry. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data according to a format rule. The video bitstream comprises a set of encoded blocks, including a current block in a current frame. The format rule specifies that a set of motion vectors are to be derived for the current block, and a set of refined motion vectors are to be derived for the current block using two or more reference pictures, the two or more reference pictures having different respective distances to the current frame.

(D1) In another aspect, some embodiments include a method of video decoding. In some embodiments, the method is performed at a computing system (e.g., the server system 112) having memory and control circuitry. In some embodiments, the method is performed at a coding module (e.g., the coding module 320). The method includes: (i) receiving a video bitstream (e.g., a coded video sequence) comprising a plurality of blocks; (ii) deriving a set of motion vectors for a current block of the plurality of blocks, the current block being within a current frame; (iii) deriving a set of refined motion vectors for the current block using two or more reference pictures, the two or more reference pictures being on a same side of the current frame; and (iv) reconstructing the current block based on the derived set of refined motion vectors. For example, a decoder side motion vector refinement process with same side reference pictures (i.e., both reference pictures are from the past, are from the future, or are the same picture) is allowed.

(D2) In some embodiments of D1, a first MVD for a first reference picture of the two or more reference pictures and a second MVD for a second reference picture of the two or more reference pictures have a same sign. For example, if the reference pictures of the decoder side motion vector refinement process are on the same side, the sign of the MVD for both reference pictures is kept the same, (e.g., no MVD mirroring).

(D3) In some embodiments of D1 or D2, the two or more reference pictures are different respective distances from the current frame.

(D4) In some embodiments of D3, the method further includes applying a scale factor to a motion vector or a motion vector difference (MVD) corresponding to the set of refined motion vectors, wherein the scale factor is based on the different respective distances. For example, if the reference pictures are not the same, the scaling process described above may also be applied with the same MVD signs.

(E1) In another aspect, some embodiments include a method of video decoding. In some embodiments, the method is performed at a computing system (e.g., the server system 112) having memory and control circuitry. In some embodiments, the method is performed at a coding module (e.g., the coding module 320). The method includes: (i) receiving a video bitstream (e.g., a coded video sequence) comprising a plurality of blocks; (ii) deriving a set of motion vectors for a current block of the plurality of blocks, the current block being within a current frame; (iii) deriving a set of refined motion vectors for the current block using two or more reference pictures, the two or more reference pictures being on different respective temporal levels; and (iv) reconstructing the current block based on the derived set of refined motion vectors. For example, a decoder side motion vector refinement process with different temporal levels of reference pictures is allowed.

(E2) In some embodiments of E1, the method further includes applying a scale factor to a motion vector or a motion vector difference (MVD) corresponding to the set of refined motion vectors, wherein the scale factor is based on the different respective temporal levels. For example, the scale factor depends on the reference picture temporal levels, the higher temporal levels of reference picture is denoted as d0, and the lower temporal reference picture is denoted as d1. The scaling factor for the refinement MV difference (MVD) on the further reference picture is d1/d0. As an example, if the MVD on the higher temporal levels motion vector moves one step, the MVD on the lower temporal reference picture moves d1/d0 steps, if d1=4, and d0=2, then the MVD on the lower temporal reference picture moves 2 steps.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A18, B1, C1, D1-D4, and E1-E2 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A18, B1, C1, D1-D4, and E1-E2 above).

As used herein, N refers to a variable number. Unless explicitly stated, different instances of N may refer to the same number (e.g., the same integer value, such as the number 2) or different numbers.

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
  receiving a video bitstream comprising a plurality of blocks;
  deriving a set of motion vectors for a current block of the plurality of blocks, the current block being within a current frame;
  identifying two or more reference pictures for the current block, the two or more reference pictures having different respective temporal distances to the current frame;
  when the different respective temporal distances are less than or equal to a threshold value, deriving a set of refined motion vectors for the current block using motion vector information from the two or more reference pictures, including:
    obtaining a scale factor that corresponds to a ratio of the different respective temporal distances;
    applying the scale factor to the motion vector information from the two or more reference pictures; and
    reconstructing the current block based on the derived set of refined motion vectors; and
  when a respective temporal distance is greater than the threshold value, reconstructing the current block based on the set of motion vectors without deriving the set of refined motion vectors.

2. The method of claim 1, wherein the scale factor is applied to motion vector information from a closer reference picture of the two or more reference pictures.

3. The method of claim 1, wherein the scale factor is applied to motion vector information from a further reference picture of the two or more reference pictures.

4. The method of claim 1, wherein the scale factor is obtained from a lookup table.

5. The method of claim 1, wherein the scale factor is obtained from an equation by inputting the different respective distances.

6. The method of claim 1, wherein applying the scale factor comprises multiplying the scale factor with a first MVD corresponding to a closer reference picture of the two or more reference pictures to generate a second MVD corresponding to a further reference picture of the two or more reference pictures.

7. The method of claim 1, wherein pre-fetching areas for the two or more reference pictures are based on the scale factor.

8. The method of claim 7, wherein a first pre-fetching area for a further reference picture is larger than a second pre-fetching area for a closer reference picture.

9. The method of claim 1, wherein the scale factor is based on coded information.

10. The method of claim 1, wherein each reference picture of the two or more reference pictures has a same pre-fetching area.

11. The method of claim 1, wherein the two or more reference pictures are on a same side of the current frame.

12. The method of claim 1, wherein the two or more reference pictures corresponds to different temporal levels.

13. A computing system, comprising:
  control circuitry;
  memory; and
  one or more sets of instructions stored in the memory and configured for execution by the control circuitry, the one or more sets of instructions comprising instructions for:
    receiving video data comprising a plurality of blocks;
    identifying a set of motion vectors for a current block of the plurality of blocks, the current block being within a current frame;
    identifying two or more reference pictures for the current block, the two or more reference pictures having different respective temporal distances to the current frame;
    when the different respective temporal distances are less than or equal to a threshold value, identifying a set of refined motion vectors for the current block using motion vector information from the two or more reference pictures, including:
      obtaining a scale factor that corresponds to a ratio of the different respective temporal distances;
      applying the scale factor to the motion vector information from the two or more reference pictures; and
      encoding the current block based on the set of refined motion vectors; and
    when a respective temporal distance is greater than the threshold value, encoding the current block based on the set of motion vectors without deriving the set of refined motion vectors.

14. The computing system of claim 13, wherein the scale factor is obtained from a lookup table.

15. The computing system of claim 13, wherein the scale factor is obtained from an equation by inputting the different respective distances.

16. The computing system of claim 13, wherein pre-fetching areas for the two or more reference pictures are based on the scale factor.

17. The computing system of claim 13, wherein each reference picture of the two or more reference pictures has a same pre-fetching area.

18. The computing system of claim 13, wherein the two or more reference pictures are on a same side of the current frame.

19. The computing system of claim 13, wherein the scale factor is restricted to integer values.

20. A non-transitory computer-readable storage medium storing a video bitstream that is generated by a video encoding method, the video bitstream comprising:

coded information for a plurality of blocks of video data, including a current block within a current frame, the current block encoded based on a set of refined motion vectors; and wherein the video encoding method comprises:

identifying a set of motion vectors for the current block;

identifying two or more reference pictures for the current block, the two or more reference pictures having different respective temporal distances to the current frame;

when the different respective temporal distances are less than or equal to a threshold value, identifying the set of refined motion vectors for the current block using motion vector information from the two or more reference pictures, including:

obtaining a scale factor that corresponds to a ratio of the different respective temporal distances; and applying the scale factor to the motion vector information from the two or more reference pictures; and encoding the current block based on the set of refined motion vectors.

* * * * *